United States Patent
Hatakeyama et al.

(10) Patent No.: US 10,488,201 B2
(45) Date of Patent: Nov. 26, 2019

(54) VIBRATION DEVICE

(71) Applicant: KABUSHIKI KAISHA TOSHIBA, Minato-ku, Tokyo (JP)

(72) Inventors: Yohei Hatakeyama, Kanagawa (JP); Tetsuro Itakura, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 125 days.

(21) Appl. No.: 15/705,223

(22) Filed: Sep. 14, 2017

(65) Prior Publication Data

US 2018/0164100 A1 Jun. 14, 2018

(30) Foreign Application Priority Data

Dec. 8, 2016 (JP) ................. 2016-238626

(51) Int. Cl.
*G01C 19/5747* (2012.01)
*G01C 19/5762* (2012.01)
(Continued)

(52) U.S. Cl.
CPC ....... *G01C 19/5747* (2013.01); *G01C 19/574* (2013.01); *G01C 19/5726* (2013.01); *G01C 19/5762* (2013.01)

(58) Field of Classification Search
CPC ............ G01C 19/5747; G01C 19/5726; G01C 19/5762; G01C 19/574; G01C 19/5635;
(Continued)

(56) References Cited

U.S. PATENT DOCUMENTS

| 5,932,804 A | 8/1999 | Hopkin et al. |
| 7,493,814 B2 | 2/2009 | Whelan et al. |

(Continued)

FOREIGN PATENT DOCUMENTS

| JP | 10-267667 | 10/1998 |
| JP | 2005-504273 | 2/2005 |

(Continued)

OTHER PUBLICATIONS

Ryunosuke Gando et al., "An Intermittent Free-Vibration MEMS Gyroscope Enabled by Catch-and-Release Mechanism for Low-Power and Fast-Startup Applications", 2017 IEEE 30th International Conference on Micro Electro Mechanical Systems (MEMS 2017) Jan. 22-26, 2017, pp. 29-32.

*Primary Examiner* — Helen C Kwok
(74) *Attorney, Agent, or Firm* — Foley & Lardner LLP

(57) ABSTRACT

According to one embodiment, a vibration device is disclosed. The device includes a mass unit including a mass unit, a catch and release mechanism to catch and release the mass unit and including an electrode unit, and a control unit to control catching and releasing of the mass unit by a voltage to be applied between the mass unit and the electrode unit. The control unit controls the voltage such that a voltage greater than a steady voltage is to be applied between the mass and electrode units before the steady voltage is applied between the mass and electrode units. The voltage greater than the steady voltage is to be applied in at least part of a period during which the mass unit is vibrating after the mass unit is released from the catch and release mechanism.

20 Claims, 9 Drawing Sheets

(51) Int. Cl.
*G01C 19/5726* (2012.01)
*G01C 19/574* (2012.01)

(58) Field of Classification Search
CPC ............ G01C 19/5642; G01C 19/5656; G01C 19/5705; G01C 19/5712; G01C 19/5719; G01C 19/5733
See application file for complete search history.

(56) References Cited

U.S. PATENT DOCUMENTS

| | | | |
|---|---|---|---|
| 7,886,598 | B2 | 2/2011 | Wyse et al. |
| 8,322,213 | B2 * | 12/2012 | Trusov ............... G01C 19/5747 73/504.12 |
| 2003/0061878 | A1 | 4/2003 | Pinson |
| 2009/0107238 | A1 | 4/2009 | Guo |
| 2009/0286833 | A1 | 11/2009 | Oberboersch et al. |
| 2009/0320592 | A1 * | 12/2009 | Glenn ................... B81B 3/0051 73/504.12 |
| 2010/0116050 | A1 * | 5/2010 | Wolfram ............. G01C 19/574 73/504.12 |
| 2010/0126270 | A1 * | 5/2010 | Terada ............... G01C 19/5719 73/504.12 |
| 2010/0236327 | A1 * | 9/2010 | Mao .................... G01C 19/5719 73/504.12 |
| 2010/0251818 | A1 | 10/2010 | Ge et al. |
| 2011/0030473 | A1 * | 2/2011 | Acar .................. G01C 19/5712 73/504.12 |
| 2011/0041608 | A1 | 2/2011 | Wilner et al. |
| 2011/0115501 | A1 * | 5/2011 | He ..................... G01C 19/5726 324/661 |
| 2012/0024056 | A1 * | 2/2012 | Hammer ............ G01C 19/5712 73/504.02 |
| 2013/0098152 | A1 | 4/2013 | Jeong et al. |
| 2014/0260608 | A1 * | 9/2014 | Lin .................... G01C 19/5747 73/504.12 |
| 2014/0260610 | A1 * | 9/2014 | McNeil ............. G01C 19/5712 73/504.12 |
| 2015/0143907 | A1 * | 5/2015 | Ullrich .................. B81B 3/0051 73/514.32 |
| 2015/0316377 | A1 * | 11/2015 | Gerson ............. G01C 19/5642 73/504.15 |
| 2015/0330783 | A1 * | 11/2015 | Rocchi .............. G01C 19/5747 73/504.12 |
| 2016/0298966 | A1 * | 10/2016 | Ikehashi ............ G01C 19/5726 |
| 2017/0268878 | A1 * | 9/2017 | Yamamoto ......... G01C 19/5762 |
| 2018/0167053 | A1 * | 6/2018 | Ikehashi .................. B81B 3/00 |
| 2018/0274923 | A1 * | 9/2018 | Ikehashi ............ G01C 19/5726 |

FOREIGN PATENT DOCUMENTS

| | | |
|---|---|---|
| JP | 2007-052012 | 3/2007 |
| JP | 2009-109494 | 5/2009 |
| JP | 2010-515021 | 5/2010 |
| JP | 2010-531446 | 9/2010 |
| JP | 2012-042250 | 3/2012 |
| JP | 2012-522987 | 9/2012 |
| JP | 2013-501941 | 1/2013 |
| JP | 5161441 | 3/2013 |
| JP | 5389664 | 1/2014 |
| JP | 2015-121551 | 7/2015 |
| WO | WO-99/44505 | 9/1999 |
| WO | WO-03/025506 | 3/2003 |
| WO | WO-2007/079930 | 7/2007 |
| WO | WO-2008/079930 | 7/2008 |
| WO | WO-2009/003541 | 1/2009 |
| WO | WO-2010/114775 | 10/2010 |
| WO | WO-2011/019879 | 2/2011 |
| WO | WO-2012/005062 | 1/2012 |
| WO | WO-2012/050194 | 4/2012 |
| WO | WO-2014/142910 | 9/2014 |

* cited by examiner

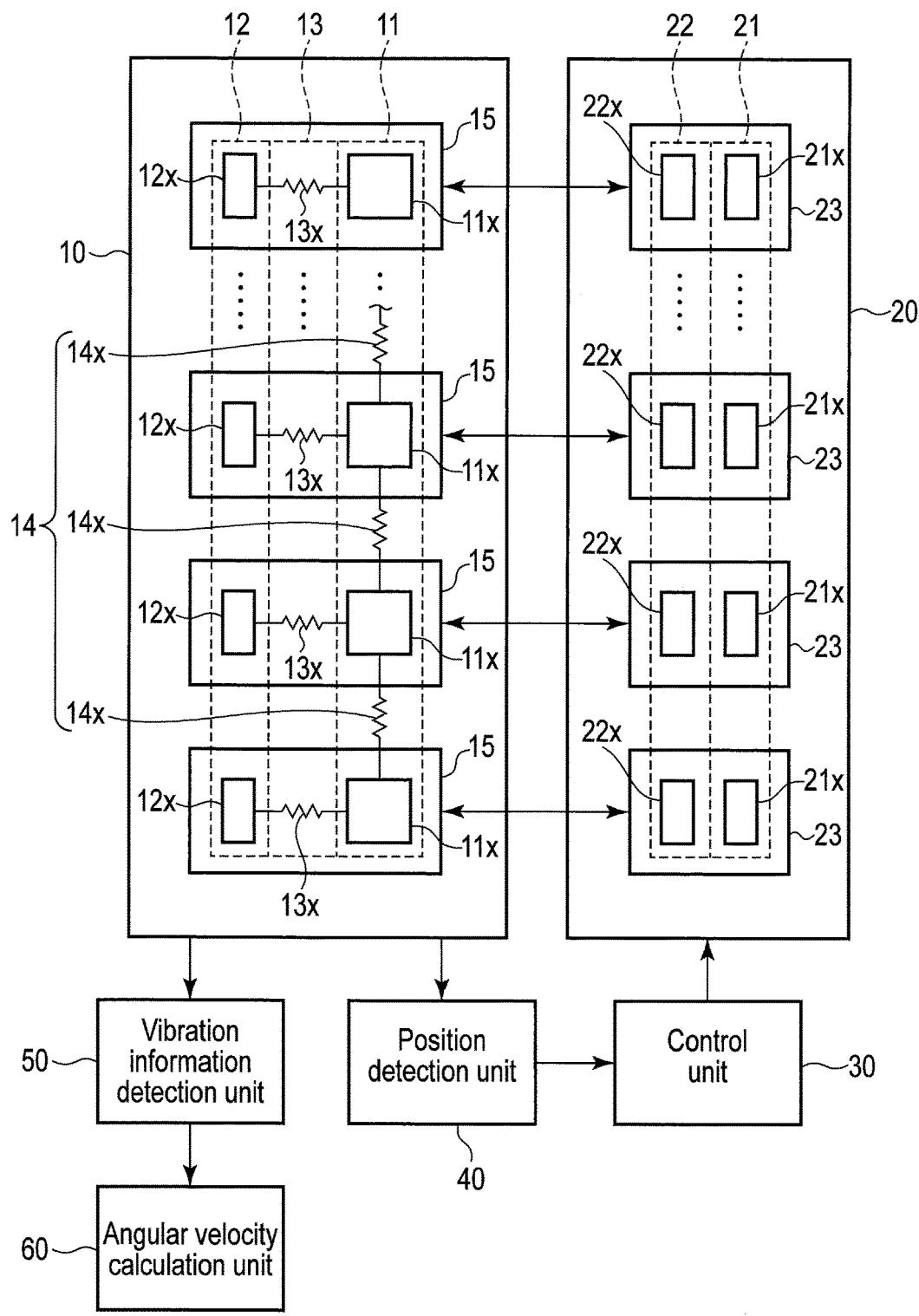
F I G. 1

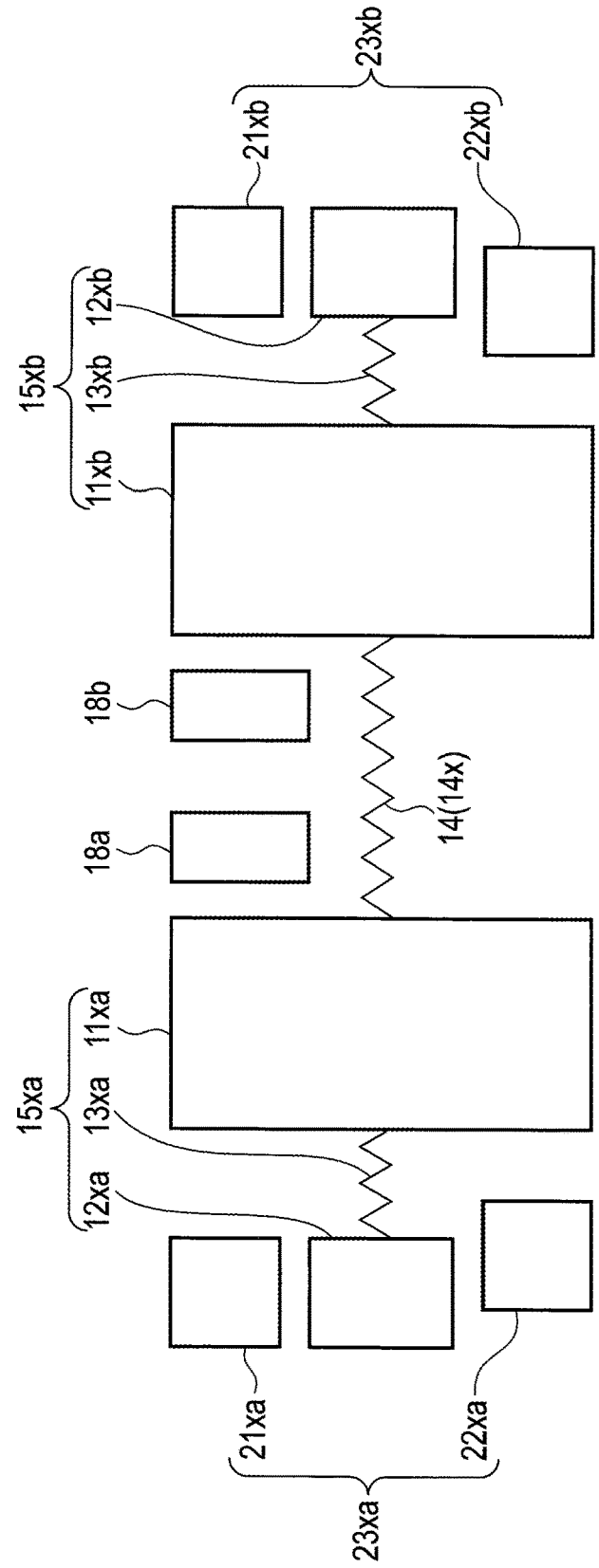
F I G. 2

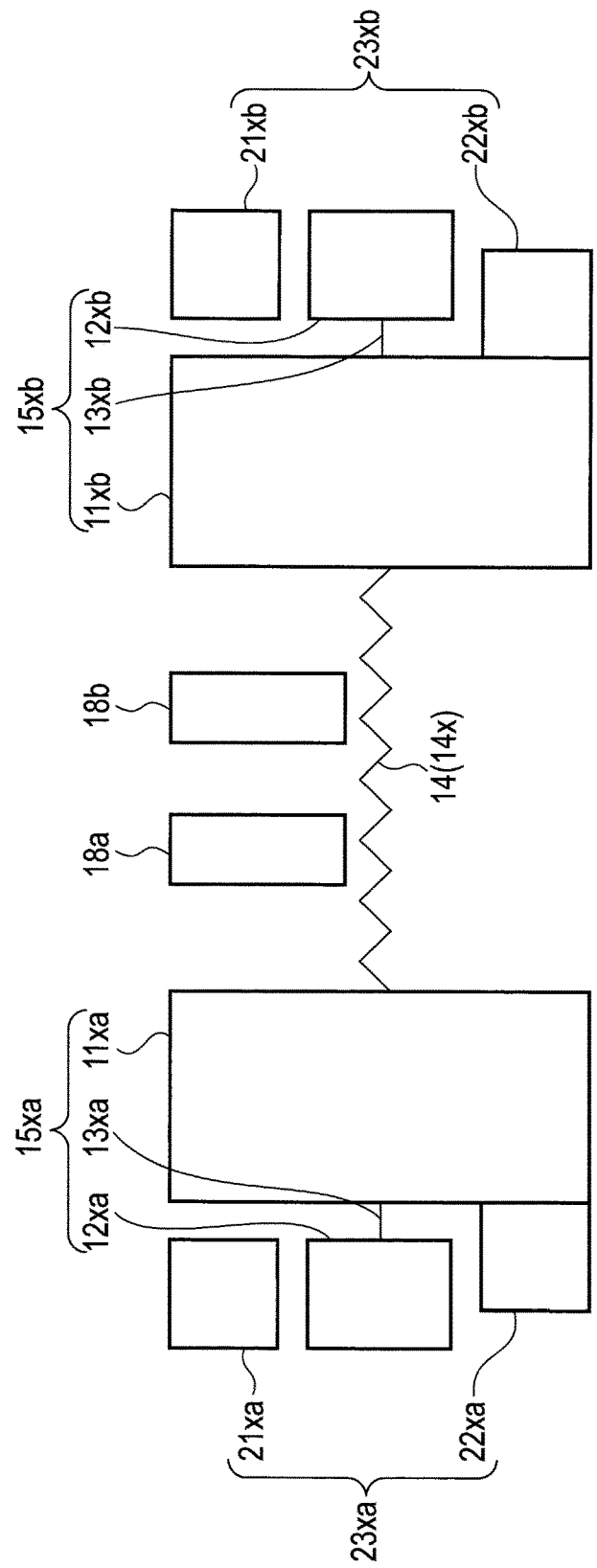
F I G. 3

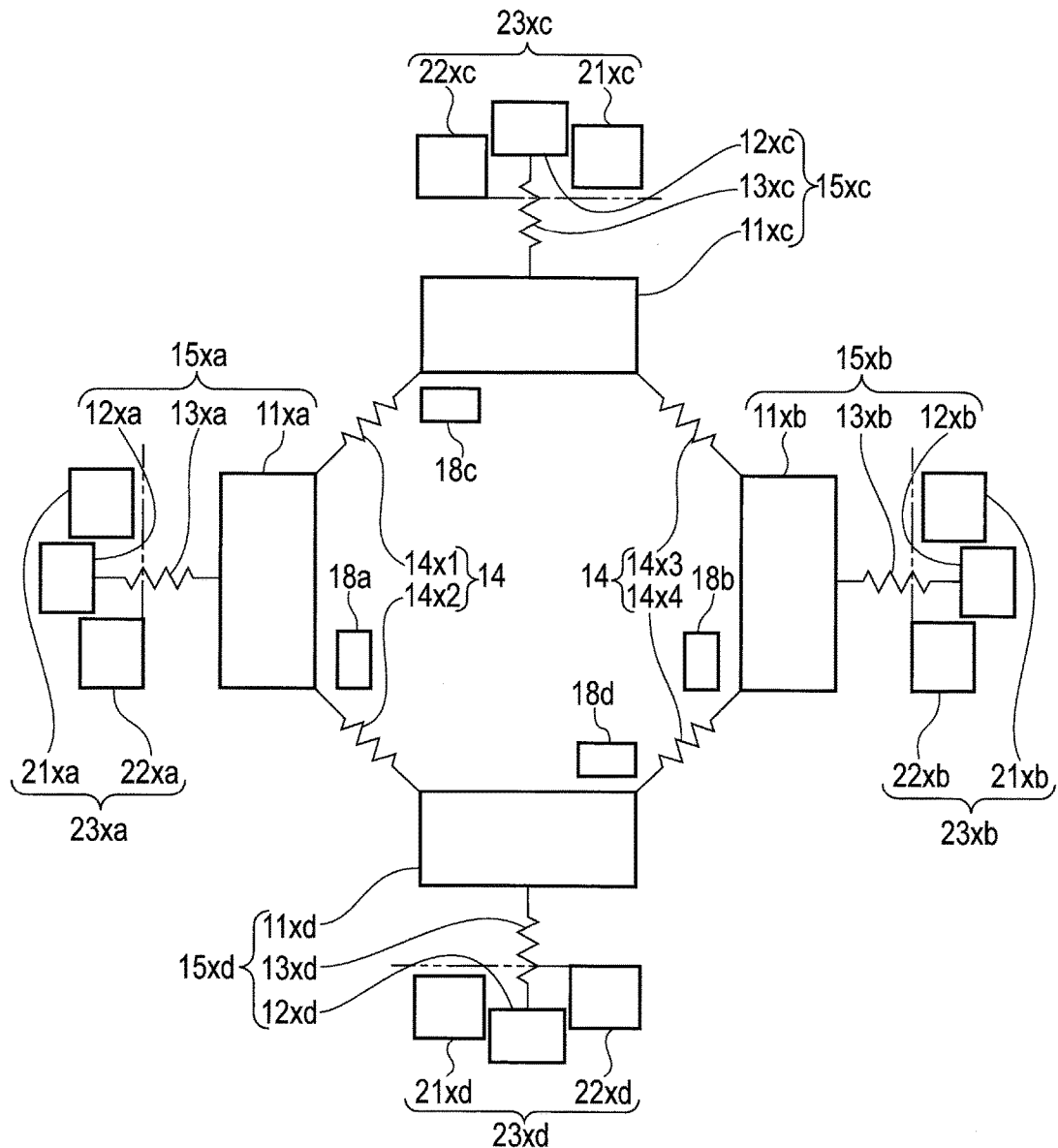
F I G. 8

US 10,488,201 B2

VIBRATION DEVICE

CROSS-REFERENCE TO RELATED APPLICATIONS

This application is based upon and claims the benefit of priority from Japanese Patent Application No. 2016-238626, filed Dec. 8, 2016, the entire contents of which are incorporated herein by reference.

FIELD

Embodiments described herein relate generally to a vibration device.

BACKGROUND

In a coupled vibrator in which a plurality of mass parts are connected, a vibration amplitude becomes larger than necessary because of a beat generated by a plurality of vibration modes. Such a vibration having a large amplitude more than necessary may cause a negative influence on the operation of the vibration device.

BRIEF DESCRIPTION OF THE DRAWINGS

FIG. 1 is a diagram illustrating a conceptual configuration of a vibration device according to an embodiment.

FIG. 2 is a diagram schematically illustrating a first configuration example of the vibration device according to an embodiment.

FIG. 3 is a diagram schematically illustrating a state when a mass part is caught by an electrode/stopper unit in the first configuration of the vibration device according to an embodiment.

FIG. 8 is a diagram schematically illustrating a third configuration example of the vibration device according to an embodiment.

DETAILED DESCRIPTION

Figure 4:
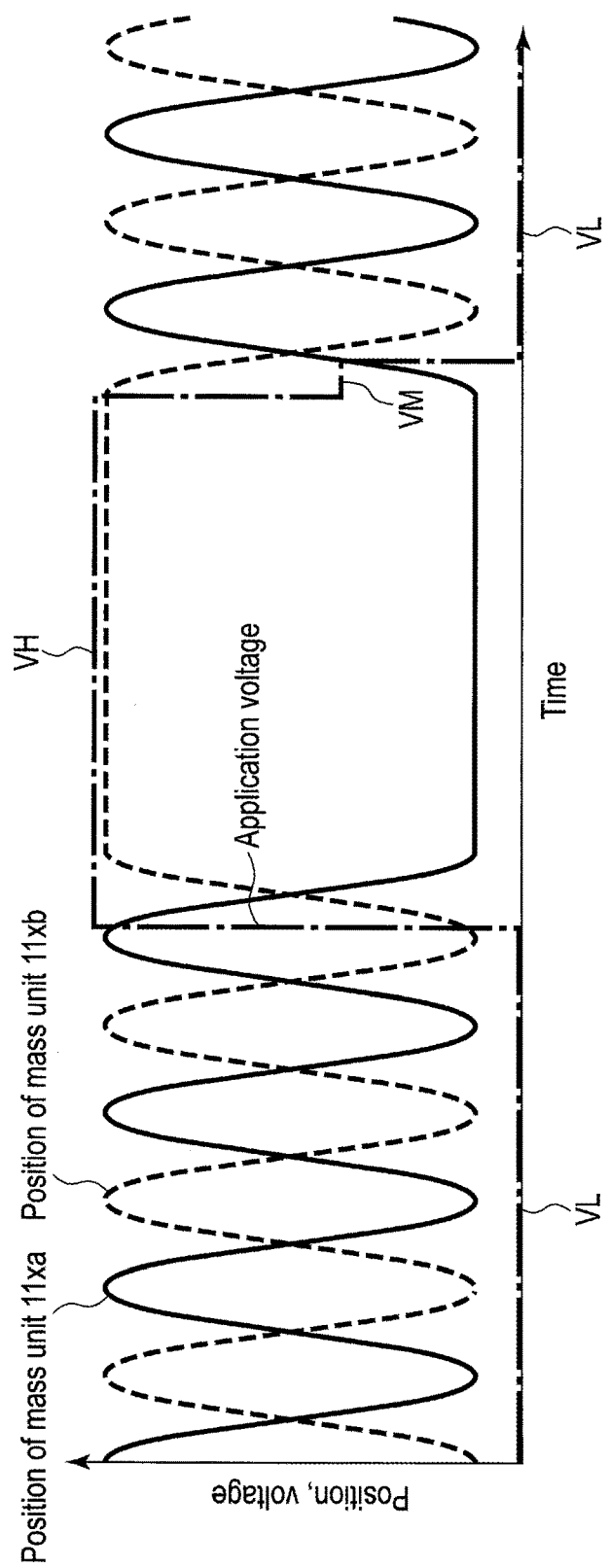
FIG. 4 is a timing chart illustrating a vibration control method of the vibration device according to an embodiment.

In general, according to one embodiment, a vibration device is disclosed. The device includes a mass unit, a catch and release mechanism, and a control unit. The coupled vibration mechanism includes a mass unit including a plurality of mass parts, and a first connection unit connecting the plurality of mass parts. The catch and release mechanism catches the mass unit being vibration and release the caught mass unit to start the mass unit vibrating. The catch and release mechanism includes an electrode unit to which a voltage for catching the mass unit is applied. The control unit controls catching and releasing of the mass unit by a voltage to be applied between the mass unit and the electrode unit. The control unit controls the voltage to be applied between the mass unit and the electrode unit such that a voltage greater than a steady voltage is to be applied between the mass unit and the electrode unit before the steady voltage is applied between the mass unit and the electrode unit. The voltage greater than the steady voltage is to be applied in at least part of a period during which the mass unit is vibrating after the mass unit is released from the catch and release mechanism.

Hereinafter, embodiments will be described with reference with the drawings.

FIG. 1 is a diagram illustrating a conceptual configuration of a vibration device according to an embodiment. The vibration device according to the present embodiment is formed on a semiconductor substrate using a MEMS (microelectromechanical systems) technique, and used as a gyro sensor (an angular velocity detection device).

The vibration device illustrated in FIG. 1 includes a coupled vibration mechanism 10, a catch and release mechanism 20, a control unit 30, a position detection unit 40, a vibration information detection unit 50, and an angular velocity calculation unit 60.

The coupled vibration mechanism 10 includes a mass unit 11, a fixed unit 12, a connection unit (second connection unit) 13, and the connection unit (first connection unit) 14.

The mass unit 11 is configured by a plurality of mass parts 11x. These mass parts 11x constitute a mass of the coupled vibration mechanism 10, and the coupled vibration mechanism 10 vibrates when these mass parts 11x vibrate.

The fixed unit 12 is configured by a plurality of fixed parts (fixed ends) 12x which are provided in correspondence with the plurality of mass parts 11x. These fixed parts 12x are fixed on the substrate.

The connection unit (second connection unit) 13 connects the plurality of mass parts 11x and the plurality of fixed parts 12x. The connection unit 13 is configured by a plurality of connection spring parts 13x which are provided in correspondence with the plurality of mass parts 11x. One end of each of the connection spring parts 13x is connected to the corresponding mass part 11x, and the other end of each of the connection spring parts 13x is connected to the corresponding fixed part 12x. Therefore, the connection spring part 13x is extended and contracted according to the vibration of the mass part 11x.

The connection unit (first connection unit) 14 connect the plurality of mass parts 11x. In the example illustrated in FIG. 1, the connection unit 14 is configured by a plurality of connection members 14x. By providing the connection unit 14, the vibration of each of the mass parts 11x is restricted by the other mass parts 11x. The connection member 14x may be formed of an elastic material such as a spring, or may be formed of a member having no elastic property (a member of which the length does not change).

The mass part 11x, the fixed part 12x, and the connection spring part 13x constitute one oscillator unit 15. The coupled vibration mechanism 10 is configured by a plurality of oscillator units 15.

The catch and release mechanism 20 catches the vibrating mass unit 11, and releases the caught mass unit 11 to start the mass unit 11 vibrating. The catch and release mechanism 20 includes an electrode unit 21 to which a voltage to catch the mass unit 11 is applied, and a stopper unit 22 which inhibits the mass unit 11 from coming in contact with the electrode unit 21 when catching the mass unit 11.

The electrode unit 21 is configured by a plurality of electrode portions 21x which are provided in correspondence with the plurality of mass parts 11x. The stopper unit 22 is configured by a plurality of stopper portions 22x which are provided in correspondence with the plurality of mass parts 11x. When a predetermined voltage is applied between the mass part 11x and the electrode portion 21x, the mass part 11x approaches the electrode portion 21x by an electrostatic force. Hereat, the contact between the mass part 11x and the electrode portion 21x is prevented by the stopper portion 22x.

The electrode portion 21x and the stopper portion 22x form one electrode/stopper unit 23, and the catch and release mechanism 20 is configured by a plurality of electrode/stopper units 23.

The control unit 30 controls catching and releasing of the mass unit 11 by a voltage applied between the mass unit 11 and the electrode unit 21. Specifically, the mass unit 11 is caught and released by applying a control voltage from the control unit 30 to the electrode unit 21. The detailed operation of the control unit 30 will be described below.

The position detection unit 40 detects a position of the mass unit 11. The control unit 30 applies a voltage between the mass unit 11 and the electrode unit 21 to catch the mass unit 11 on the basis of the position of the mass unit 11 detected by the position detection unit 40. That is, the position detection unit 40 detects the position of the mass unit 11 in the middle of the vibrating of the mass unit 11, and the control unit 30 applies the control voltage to the electrode unit 21 to catch the mass unit 11 at an optimal timing.

The vibration information detection unit 50 is used to detect vibration information of the mass unit 11. Specifically, the vibration information detection unit 50 detects a predetermined physical quantity which varies according to the vibration of the mass unit 11. The predetermined physical quantity includes a physical quantity based on electrostatic capacitance, a physical quantity based on resistance, or a physical quantity based on a piezoelectric effect. The physical quantity based on the electrostatic capacitance is detected by a variable capacitance element, the physical quantity based on resistance by a variable resistance element, and the physical quantity based on the piezoelectric effect by a piezoelectric element. In the present embodiment, the vibration information detection unit 50 uses the variable capacitance element to detect the vibration information of the mass unit 11 based on a Coriolis force working on the mass unit 11. Specifically, when a rotational motion is added to the mass unit 11 in the middle of the vibrating of the mass unit 11, the Coriolis force works on the mass unit 11. In the vibration information detection unit 50, the vibration information of the mass unit 11 based on the Coriolis force is detected from a variation in the electrostatic capacitance of the variable capacitance element.

The angular velocity calculation unit 60 calculates an angular velocity of the mass unit 11 on the basis of the vibration information detected by the vibration information detection unit 50. That is, the amplitude of the mass unit 11 based on the Coriolis force is proportional to the angular velocity of the mass unit 11. Therefore, the angular velocity of the mass unit 11 can be calculated by the angular velocity calculation unit 60 by detecting the amplitude information of the mass unit 11 based on the Coriolis force using the vibration information detection unit 50.

FIG. 2 is a diagram schematically illustrating a first configuration example of the vibration device according to the present embodiment. The basic concept is similar to that of the vibration device illustrated in FIG. 1.

In the vibration device illustrated in FIG. 2, the coupled vibration mechanism is configured by two vibrator units 15xa and 15xb, and the catch and release mechanism is configured by two electrode/stopper units 23xa and 23xb.

The vibrator unit 15xa includes a mass part 11xa, a fixed part 12xa, and a connection spring part 13xa. Similarly, the vibrator unit 15xb includes a mass part 11xb, a fixed part 12xb, and a connection spring part 13xb.

The electrode/stopper unit 23xa includes an electrode portion 21xa and a stopper portion 22xa. Similarly, the electrode/stopper unit 23xb includes an electrode portion 21xb and a stopper portion 22xb.

The mass part (first mass part) 11xa and the mass part (second mass part) 11xb are arranged in a direction parallel to a vibration direction (first direction), and connected by the connection unit 14. In the present embodiment, the connection unit 14 is configured by a single connection member 14x.

An electrode portion 18a is provided in the vicinity of the mass part 11xa, and a first variable capacitor is configured by the mass part 11xa and the electrode portion 18a. Similarly, an electrode portion 18b is provided in the vicinity of the mass part 11xb, and a second variable capacitor is configured by the mass part 11xb and the electrode portion 18b. When the mass parts 11xa and 11xb vibrate, a distance between the mass part 11xa and the electrode portion 18a and a distance between the mass part 11xb and the electrode portion 18b vary. As a result, the capacitance value of the first variable capacitor and the capacitance value of the second variable capacitor vary. The vibration information detection unit 50 of FIG. 1 detects the vibration information on the basis of the variation of these capacitance values.

The mass part 11xa and the mass part 11xb vibrate in an anti-phase to each other. That is, when the mass part 11xa moves away from the fixed part 12xa, the mass part 11xb also moves away from the fixed part 12xb. On the contrary, when the mass part 11xa approaches the fixed part 12xa, the mass part 11xb also approaches the fixed part 12xb. In this way, since the mass part 11xa and the mass part 11xb vibrate in an anti-phase, an influence of a translational motion such as acceleration can be excluded, and the rotational motion can be extracted with accuracy.

FIG. 3 is a diagram schematically illustrating a state when the mass parts 11xa and 11xb each are caught by the electrode/stopper units 23xa and 23xb respectively.

When a predetermined voltage is applied to the electrode portion 21xa and the electrode portion 21xb, an electrostatic attraction force works between the electrode portion 21xa and the mass part 11xa and between the electrode portion 21xb and the mass part 11xb. Hereat, the contact between the electrode portion 21xa and the mass part 11xa and the contact between the electrode portion 21xb and the mass part 11xb can be prevented by the stopper portion 22xa and the stopper portion 22xb. That is, the distance between the stopper portion 22xa and the mass part 11xa is smaller than the distance between the electrode portion 21xa and the mass part 11xa. Similarly, the distance between the stopper portion 22xb and the mass part 11xb is smaller than the distance between the electrode portion 21xb and the mass part 11xb. Therefore, the contact between the electrode portion 21xa and the mass part 11xa and the contact between the electrode portion 21xb and the mass part 11xb can be prevented.

A timing of catching the mass parts 11xa and 11xb by the electrode/stopper units 23xa and 23xb is determined by the control unit 30 and the position detection unit 40 illustrated in FIG. 1. Specifically, a state when the mass parts 11xa and 11xb most approach the fixed parts 12xa and 12xb is detected by the position detection unit 40, and a predetermined voltage is applied from the control unit 30 to the electrode portions 21xa and 21xb on the basis of the detection result of the position detection unit 40. By doing this, the mass parts 11xa and 11xb are caught by the electrode/stopper units 23xa and 23xb respectively.

Next, a timing of releasing the mass parts 11xa and 11xb from the electrode/stopper units 23xa and 23xb will be described.

As illustrated in FIG. 3, the mass parts 11xa and 11xb are caught by the electrode/stopper units 23xa and 23xb before the mass parts 11xa and 11xb start to vibrate. In this state, the mass parts 11xa and 11xb can be released from the electrode/stopper units 23xa and 23xb by changing a voltage to be applied to the electrode portion 21xa and the electrode portion 21xb, and the mass parts 11xa and 11xb start to vibrate. Hereinafter, the details will be described.

As mentioned above already, in the vibration device of the present embodiment, the mass parts 11xa and 11xb vibrate in the anti-phase to each other. Therefore, an influence of the translational motion such as acceleration can be excluded, and the rotational motion can be extracted with accuracy. However, when the mass parts 11xa and 11xb are released from being caught by the electrode/stopper units 23xa and 23xb and start to vibrate, a vibration component in an in-phase mode is also generated by a difference in a resonant frequency between the mass part 11xa and the mass part 11xb or a difference in releasing timing between the mass part 11xa and the mass part 11xb. As a result, the vibration in the anti-phase mode and the vibration in the in-phase mode are superimposed so as to generate a beat. When the beat is generated, the vibration amplitudes of the mass parts 11xa and 11xb exceed an allowable range. Therefore, there is a concern that the mass parts 11xa and 11xb in the middle of vibration come into contact with the stopper portions 22xa and 22xb. As a result, the vibrations of the mass parts 11xa and 11xb receive a negative influence, and the detection operation is not able to be made with accuracy.

In the present embodiment, the following method is employed to prevent the above problems.

FIG. 4 is a timing chart illustrating a vibration control method of the vibration device according to the present embodiment. The horizontal axis represents time. The vertical axis represents positions of the mass parts 11xa and 11xb, and voltages to be applied to the electrode portions 21xa and 21xb (a voltage to be applied between the electrode portion 21xa and the mass part 11xa, and a voltage to be applied between the electrode portion 21xb and the mass part 11xb).

As illustrated in FIG. 4, in the present embodiment, when the mass parts 11xa and 11xb are caught by the electrode/stopper units 23xa and 23xb respectively, and then the mass parts 11xa and 11xb are released from the electrode/stopper units 23xa and 23xb respectively, the voltage does not directly move from a hold voltage VH to a release voltage VL, but there is provided an application period of an intermediate voltage VM between the application period of the hold voltage VH and the application period of the release voltage VL. In the present embodiment, the intermediate voltage VM is smaller than the hold voltage VH, and larger than the release voltage VL.

In this way, the vibration energy of the mass parts 11xa and 11xb at the time of release can be reduced by providing the application period of the intermediate voltage VM. By doing this, the vibration amplitudes of the mass parts 11xa and 11xb (in particular, the amplitude of the anti-phase mode) can be made small, and the amplitude of the beat can also be made small. Therefore, it is possible to prevent the mass parts 11xa and 11xb from coming into contact with the stopper portions 22xa and 22xb in the middle of vibration, and the detection operation can be performed with accuracy.

Figure 5:
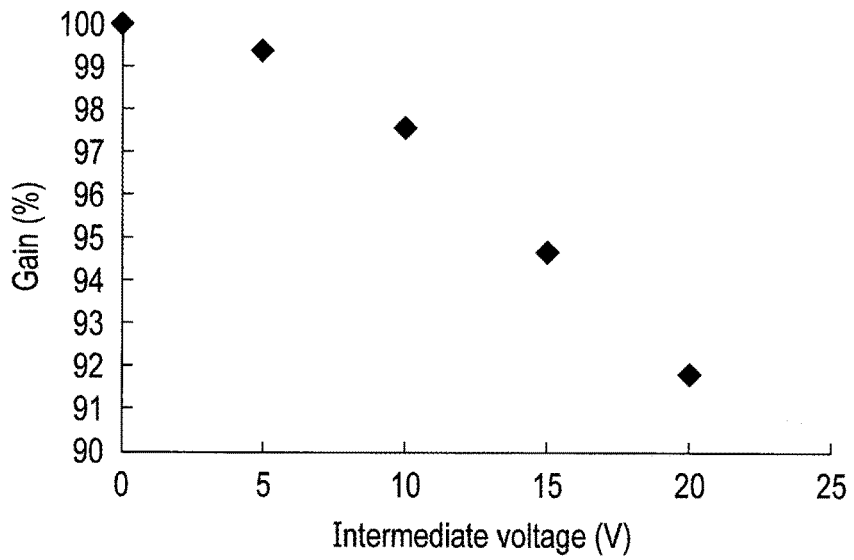
FIG. 5 is a diagram illustrating a relation between an intermediate voltage and a gain of a vibration amplitude according to an embodiment.

FIG. 5 is a diagram illustrating a relation between the intermediate voltage VM and a gain of the vibration amplitude. The horizontal axis represents the intermediate voltage, and the vertical axis represents the gain. The hold voltage VH is 23 (V). The gain is a ratio of a maximum amplitude in a case where the application period of the intermediate voltage is provided, with respect to a maximum amplitude in a case where the application period of the intermediate voltage is not provided. As illustrated in FIG. 5, when the intermediate voltage becomes higher, a larger attenuation can be obtained.

Figure 6:
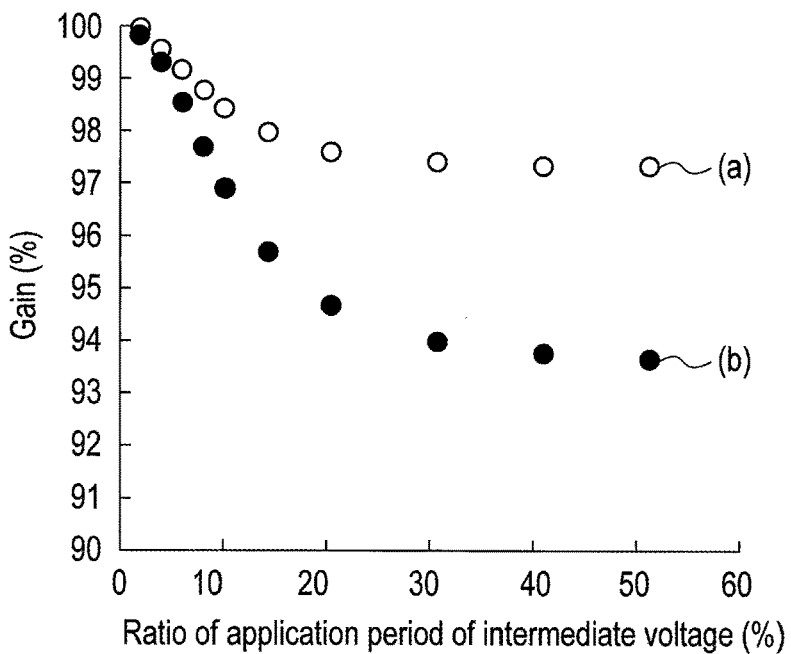
FIG. 6 is a diagram illustrating a relation between an application period of the intermediate voltage and a gain of a vibration amplitude according to an embodiment.

FIG. 6 is a diagram illustrating a relation between the application period of the intermediate voltage VM and the gain of the vibration amplitude. The horizontal axis represents a ratio of the application period of the intermediate voltage, and the vertical axis represents the gain. The ratio of the application period of the intermediate voltage is a ratio of the application period (application time) of the intermediate voltage with respect to one cycle of the vibration. The gain is a ratio of a maximum amplitude in a case where the application period of the intermediate voltage is provided, with respect to a maximum amplitude in a case where the application period of the intermediate voltage is not provided. (a) indicates a case where the intermediate voltage is 10 (V), and (b) indicates a case where the intermediate voltage is 15 (V). As illustrated in FIG. 6, when the application period of the intermediate voltage is set to be equal to or more than a certain period, the gain can be set by the value of the intermediate voltage without depending on the application period.

Figure 7:
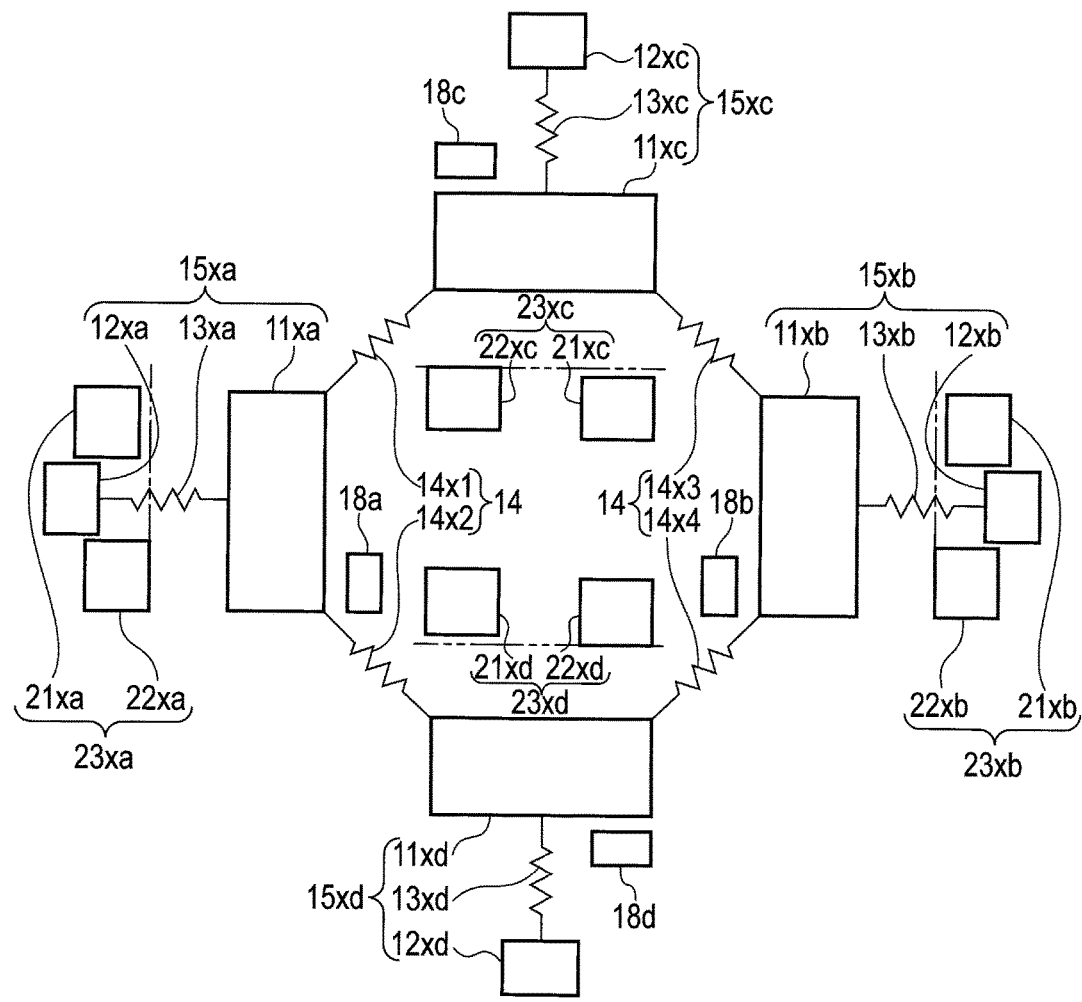
FIG. 7 is a diagram schematically illustrating a second configuration example of the vibration device according to an embodiment.

FIG. 7 is a diagram schematically illustrating a second configuration example of the vibration device according to the present embodiment. The basic concept is similar to that of the vibration device illustrated in FIG. 1. In addition, the basic configuration is similar to that of the first configuration example illustrated in FIGS. 2 and 3, and thus the same description as that in the first configuration example will be omitted.

In the vibration device illustrated in FIG. 7, the coupled vibration mechanism is configured by four vibrator units 15xa, 15xb, 15xc, and 15xd, and the catch and release mechanism is configured by four electrode/stopper units 23xa, 23xb, 23xc, and 23xd.

The vibrator unit 15xa includes a mass part 11xa, a fixed part 12xa, and a connection spring part 13xa. The vibrator unit 15xb includes the mass part 11xb, the fixed part 12xb, and the connection spring part 13xb. The vibrator unit 15xc includes a mass part 11xc, a fixed part 12xc, and a connection spring part 13xc. The vibrator unit 15xd includes a mass part 11xd, a fixed part 12xd, and a connection spring part 13xd.

The electrode/stopper unit 23xa includes an electrode portion 21xa and a stopper portion 22xa. The electrode/stopper unit 23xb includes the electrode portion 21xb and the stopper portion 22xb. The electrode/stopper unit 23xc includes an electrode portion 21xc and a stopper portion 22xc. The electrode/stopper unit 23xd includes an electrode portion 21xd and a stopper portion 22xd.

The mass part (first mass part) 11xa and the mass part (second mass part) 11xb are arranged in a direction parallel to the vibration direction (first direction) thereof. The mass part (third mass part) 11xc and the mass part (fourth mass part) 11xd are arranged in a direction parallel to the vibration direction (second direction) thereof. The second direction is perpendicular to the first direction.

The mass part 11xa, the mass part 11xb, the mass part 11xc, and the mass part 11xd are connected by the connection unit 14. Specifically, the connection unit 14 is configured by a connection member 14x1 which connects the mass part 11xa and the mass part 11xc, a connection member 14x2 which connects the mass part 11xa and the mass part 11xd, a connection member 14x3 which connects the mass part 11xb and the mass part 11xc, and a connection member 14x4 which connects the mass part 11xb and the mass part 11xd.

An electrode portion 18a is provided in the vicinity of the mass part 11xa, and a first variable capacitor is configured by the mass part 11xa and the electrode portion 18a. The electrode portion 18b is provided in the vicinity of the mass part 11xb, and the second variable capacitor is configured by the mass part 11xb and the electrode portion 18b. An electrode portion 18c is provided in the vicinity of the mass part 11xc, and a third variable capacitor is configured by the mass part 11xc and the electrode portion 18c. An electrode portion 18d is provided in the vicinity of the mass part 11xd, and a fourth variable capacitor is configured by the mass part 11xd and the electrode portion 18d.

Similarly to the first configuration example illustrated in FIGS. 2 and 3, the capacitance values of the first, second, third, and fourth variable capacitors vary as the distances between the mass parts 11xa, 11xb, 11xc, and 11xd and the corresponding electrode portions 18a, 18b, 18c, and 18d change. The vibration information detection unit 50 of FIG. 1 detects the vibration information on the basis of the variation of these capacitance values.

The mass part 11xa and the mass part 11xb vibrate in the anti-phase to each other. That is, when the mass part 11xa moves away from the fixed part 12xa, the mass part 11xb also moves away from the fixed part 12xb. On the contrary, when the mass part 11xa approaches the fixed part 12xa, the mass part 11xb also approaches the fixed part 12xb. Similarly, the mass part 11xc and the mass part 11xd also vibrate in the anti-phase to each other. In this way, since the mass part 11xa and the mass part 11xb vibrate in the anti-phase, and the mass part 11xc and the mass part 11xd vibrate in the anti-phase, the influence of the translational motion such as acceleration can be excluded, and the rotational motion can be extracted with accuracy.

In addition, a pair of the mass part 11xa and the mass part 11xb and a pair of the mass part 11xc and the mass part 11xd vibrate in the anti-phase to each other. That is, when the mass part 11xa and the mass part 11xb approach each other, the mass part 11xc and the mass part 11xd move away from each other. When the mass part 11xa and the mass part 11xb move away from each other, the mass part 11xc and the mass part 11xd approach each other.

The basic principle and the basic operation when the mass parts 11xa, 11xb, 11xc, and 11xd are caught by the electrode/stopper units 23xa, 23xb, 23xc, and 23xd respectively are similar to those of the first configuration example illustrated in FIGS. 2 and 3. In this configuration example, since the pair of the mass parts 11xa and 11xb and the pair of the mass parts 11xc and 11xd vibrate in the anti-phase to each other, the mass parts 11xc and 11xd are caught by the electrode/stopper units 23xc and 23xd respectively at timing when the mass parts 11xa and 11xb are caught by the electrode/stopper units 23xa and 23xb respectively. The basic principle and the basic operation when the mass parts 11xa, 11xb, 11xc, and 11xd are released from the electrode/stopper units 23xa, 23xb, 23xc, and 23xd are also similar to those of the first configuration example illustrated in FIGS. 2, 3, and 4. That is, even in this configuration example, the application period of the intermediate voltage VM is provided between the application period of the hold voltage VH and the application period of the release voltage VL similarly to FIG. 4 of the first configuration example. By doing this, even in this configuration example, the amplitude of the beat can also be made small similarly to the first configuration example, and it is possible to prevent that the mass parts 11xa, 11xb, 11xc, and 11xd come into contact with the stopper portions 22xa, 22xb, 22xc, and 22xd in the middle of vibration, and thus the detection operation can be performed with accuracy.

FIG. 8 is a diagram schematically illustrating a third configuration example of the vibration device according to the present embodiment. The basic concept is similar to that of the vibration device illustrated in FIG. 1. In addition, the basic configuration is similar to that of the first configuration example illustrated in FIGS. 2 and 3 and that of the second configuration example illustrated in FIG. 7. Therefore, the same description as those in the first configuration example and the second configuration example will be omitted.

Similarly to the second configuration example illustrated in FIG. 7, even in this configuration example, the mass part 11xa and the mass part 11xb vibrate in the anti-phase to each other, and the mass part 11xc and the mass part 11xd also vibrate in the anti-phase to each other. However, in this configuration example, the pair of the mass part 11xa and the mass part 11xb and the pair of the mass part 11xc and the mass part 11xd vibrate in the in-phase to each other. That is, when the mass part 11xa and the mass part 11xb approach each other, the mass part 11xc and the mass part 11xd also approach each other, and when the mass part 11xa and the mass part 11xb move away from each other, the mass part 11xc and the mass part 11xd also move away from each other.

The basic principle and the basic operation when the mass parts 11xa, 11xb, 11xc, and 11xd are caught by the electrode/stopper units 23xa, 23xb, 23xc, and 23xd respectively are similar to those of the first configuration example illustrated in FIGS. 2 and 3. In this configuration example, since the pair of the mass parts 11xa and 11xb and the pair of the mass parts 11xc and 11xd vibrate in the in-phase to each other, the mass parts 11xc and 11xd are caught by the electrode/stopper units 23xc and 23xd respectively at timing when the mass parts 11xa and 11xb are caught by the electrode/stopper units 23xa and 23xb respectively.

The basic principle and the basic operation when the mass parts 11xa, 11xb, 11xc, and 11xd are released from the electrode/stopper units 23xa, 23xb, 23xc, and 23xd are also similar to those of the first configuration example illustrated in FIGS. 2, 3, and 4. That is, even in this configuration example, the application period of the intermediate voltage VM is provided between the application period of the hold voltage VH and the application period of the release voltage VL similarly to FIG. 4 of the first configuration example. By doing so, even in this configuration example, the amplitude of the beat can be made small similarly to the first configuration example, and it is possible to prevent that the mass parts 11xa, 11xb, 11xc, and 11xd come into contact with the stopper portions 22xa, 22xb, 22xc, and 22xd in the middle of vibration, and thus the detection operation can be performed with accuracy.

It is noted that the vibration control method of the vibration device described above is an example, and in general, it is possible to employ the following vibration control method.

In the above-described embodiment, as illustrated in FIG. 4, the intermediate voltage VM is applied immediately after a release timing of the mass unit 11. By doing so, the vibration energy of the mass part is reduced, and the amplitude of the mass part can be made small. In consideration of the role of such an intermediate voltage VM, the timing of applying the intermediate voltage VM is not necessary to be immediately after the release timing of the mass unit 11.

In addition, in the above-described embodiment, as illustrated in FIG. 4, the amplitude of the intermediate voltage VM is set to be smaller than the hold voltage VH and larger than the release voltage VL. However, in consideration of the role of the above-described intermediate voltage VM, the intermediate voltage VM is set to be larger than the release voltage VL, and not necessarily set to be smaller than the hold voltage VH.

From the above, in general, the control unit 30 should control the application voltage such that a voltage greater than a steady voltage is to be applied between the mass unit 11 and the electrode unit 21 in at least part of period before the steady voltage is applied between the mass unit 11 and the electrode unit 21 after the mass unit 11 is released from the catch and release mechanism 20. The steady voltage is a voltage to be normally applied between the mass unit 11 and the electrode unit 21 in the middle of the vibrating of the mass unit 11. In general, the steady voltage is a voltage to be finally applied between the mass unit 11 and the electrode unit 21 in the middle of the vibrating of the mass unit 11. In the example illustrated in FIG. 4, the release voltage VL corresponds to the steady voltage. The steady voltage is, for example, 0 (volt).

Note that, as described above, the intermediate voltage VM is not necessarily a voltage between the release voltage VL and the hold voltage VH. Therefore, in the following description, when the intermediate voltage VM to be applied between the mass unit 11 and the electrode unit 21 is larger than the steady voltage, it will be referred to as "amplitude suppression voltage".

Hereinafter, the description will be given about the vibration control method which is normally preferred in the vibration device in accordance with the present embodiment.

Figure 9:
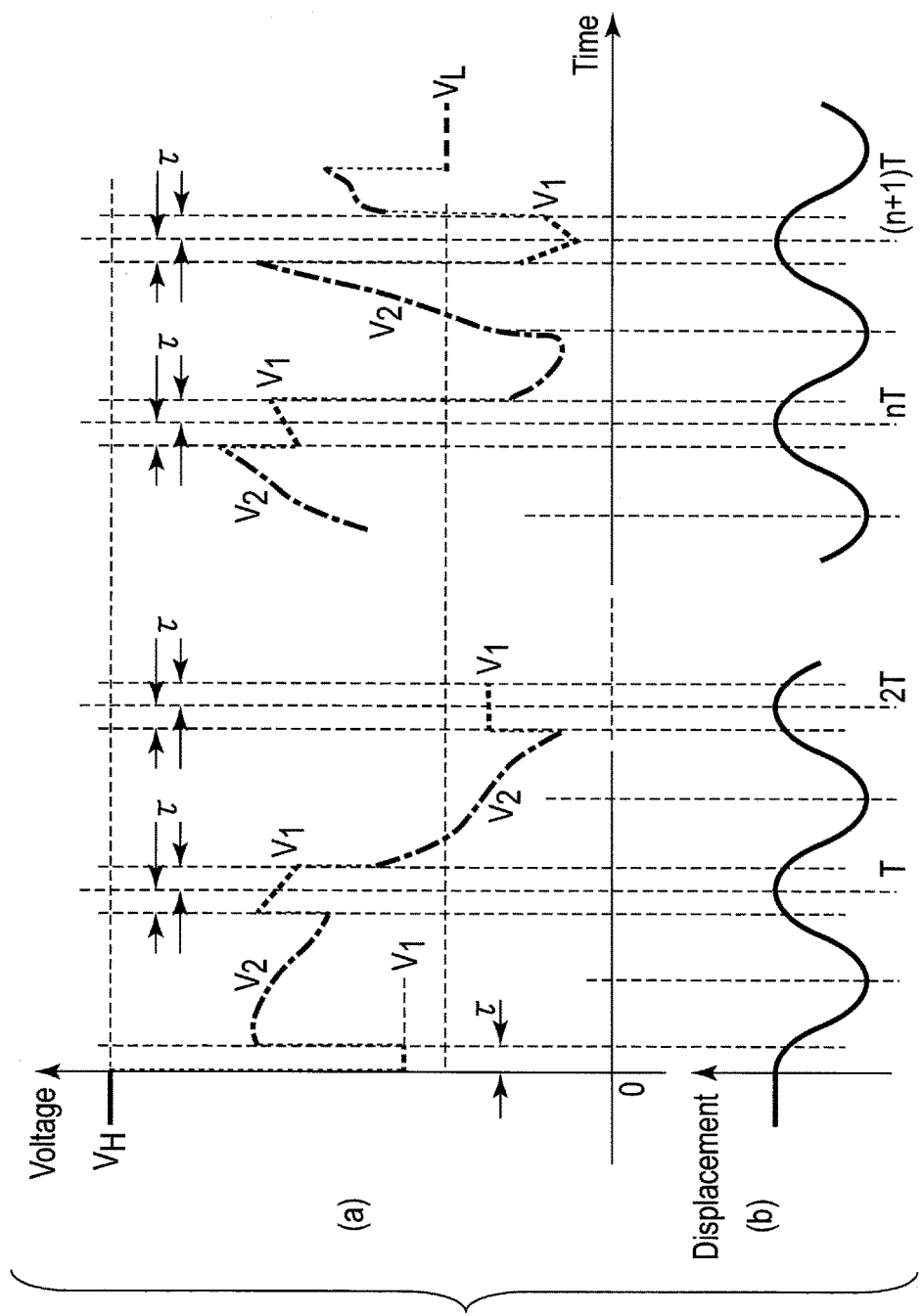
FIG. 9 is a timing chart illustrating a typical method which is preferable for the vibration control method of the vibration device according to an embodiment.

FIG. 9 is a timing chart illustrating the vibration control method which is normally preferred in the vibration device according to the present embodiment. FIG. 9 (a) illustrates a voltage (absolute voltage) which is applied between the mass unit 11 and the electrode unit 21. FIG. 9 (b) illustrates displacements of the mass unit 11, in which the upper peak of the waveform indicates a displacement when the distance between the mass unit 11 and the electrode unit 21 is the shortest, and the lower peak of the waveform indicates a displacement when the distance between the mass unit 11 and the electrode unit 21 is the farthest. The horizontal axis represents elapsed time t since the mass unit 11 is released from the catch and release mechanism 20.

Hereinafter, the description will be given about the vibration control method which is normally preferred in the vibration device according to the present embodiment with reference to the vibration device illustrated in FIG. 1 and the timing chart illustrated in FIG. 9.

A time when a process of releasing the mass unit 11 from the catch and release mechanism 20 starts is set to t=0. In addition, a period of a main resonant mode of the mass unit 11 is set to T. As already described in the first, second, and third configuration examples, the vibration device of the present embodiment is vibrated in an anti-phase resonant mode. Therefore, the main resonant mode of the mass unit 11 is the anti-phase resonant mode. In addition, a voltage between the mass unit 11 and the electrode unit 21 which is necessary for the catch and release mechanism 20 to catch the mass unit 11 is referred to VH (corresponding to the hold voltage VH of FIG. 4), and a voltage to be applied between the mass unit 11 and the electrode unit 21 when the vibration of the mass unit 11 is in a steady state is referred to VL (corresponding to the release voltage VL of FIG. 4). In addition, n is assumed to indicate a positive integer in the following description.

As already described above, the "amplitude suppression voltage" is provided to make the amplitude of the mass part small. The amplitude suppression voltage is preferably applied when the mass unit 11 moves away from the catch and release mechanism 20 in order to effectively perform such a function. That is, in FIG. 9 (b), the amplitude suppression voltage is preferably applied in a period when the displacement (vertical axis) falls down. Therefore, the control unit 30 preferably controls the application voltage such that the amplitude suppression voltage (a voltage larger than the steady voltage) is applied between the mass unit 11 and the electrode unit 21 in at least part of a period satisfying $(n-1)T<t<(n-½)T$. In FIG. 9, a voltage V2 is applied as the amplitude suppression voltage in at least part of the period satisfying $(n-1)T<t<(n-½)T$.

In addition, when a large voltage is applied between the mass unit 11 and the electrode unit 21 in the middle of the vibrating of the mass unit 11, there is a concern that the mass unit 11 is caught by the catch and release mechanism 20. That is, assuming that VH0 is a minimum voltage between the mass unit 11 and the electrode unit 21 which is necessary for the catch and release mechanism 20 to catch the mass unit 11, when a voltage equal to or more than VH0 is applied between the mass unit 11 and the electrode unit 21 in the middle of the vibrating of the mass unit 11, there is a concern that the mass unit 11 is caught by the catch and release mechanism 20. In particular, when the distance between the mass unit 11 and the electrode unit 21 is the shortest, it is not preferable that a voltage equal to or more than VH0 is applied. That is, in FIG. 9B, it is not preferable that a voltage equal to or more than VH0 is applied at the upper peak of the displacement (vertical axis) and the vicinity thereof.

From the above description, the control unit 30 preferably controls the application voltage in the entire period satisfying $0<t<\tau$ and $nT-\tau<t<nT+\tau$ ($\tau$ is a fine period shorter than T/2) such that a voltage V1 (V1 is an arbitrary voltage smaller than VH0) is applied between the mass unit 11 and the electrode unit 21. In this case, the control unit 30 preferably controls the application voltage in at least part of the period satisfying $(n-1)T+\tau<t<(n-½)T$ such that the voltage V2 is applied as the amplitude suppression voltage between the mass unit 11 and the electrode unit 21. In FIG. 9, the voltage V1 is applied in the entire period satisfying $0<t<\tau$ and $nT-\tau<t<nT+\tau$, and the voltage V2 is applied as the amplitude suppression voltage in at least part of the period satisfying $(n-1)T+\tau<t<(n-½)T$.

Figure 10:
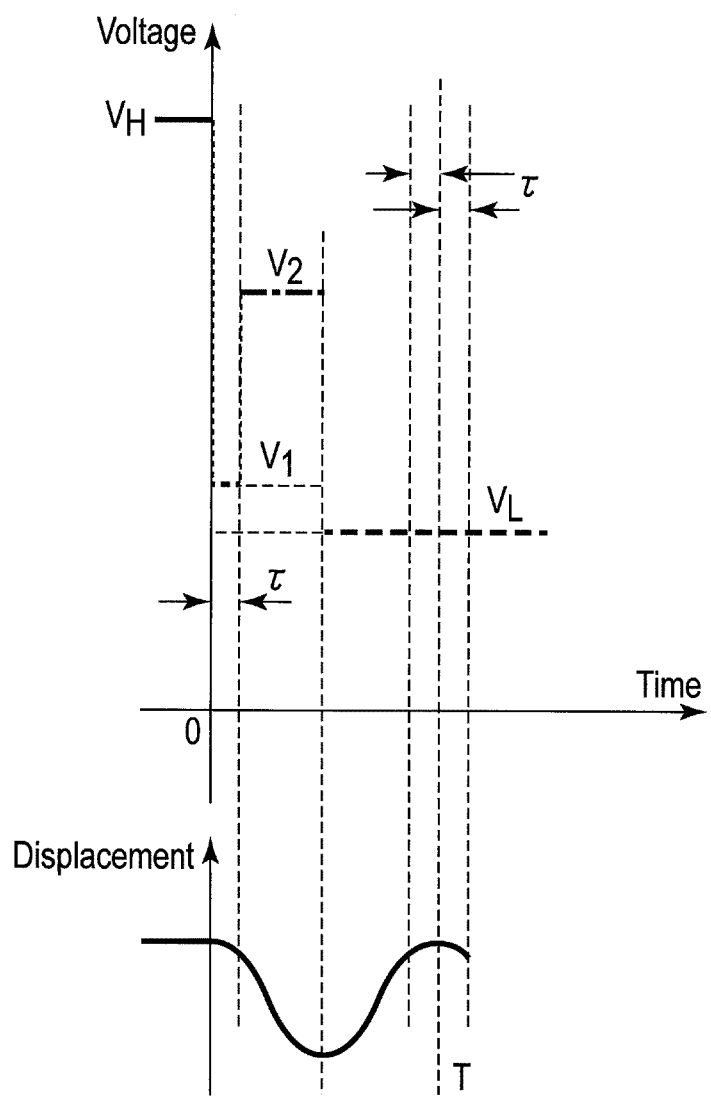
FIG. 10 is a timing chart illustrating an exemplary typical method which is preferable for the vibration control method of the vibration device according to an embodiment.

FIG. 10 is a timing chart illustrating an example of the vibration control method which satisfies the above conditions.

In general, as the above-described embodiment, it is preferable that the amplitude suppression voltage (for example, the intermediate voltage VM) is applied immediately after the release timing of the mass unit 11. In this case, as illustrated in FIG. 10, the control unit 30 preferably controls the application voltage such that the amplitude suppression voltage (a voltage larger than the steady voltage; that is, the voltage V2 in FIG. 10) is applied between the mass unit 11 and the electrode unit 21, and the steady voltage is applied between the mass unit 11 and the electrode unit 21 in at least part of a period satisfying 0<t<T/2. In this way, when the amplitude suppression voltage is applied in an early stage of the vibration, most influence does not work on the vibration thereafter, and thus the amplitude can be suppressed. In this way, by applying the amplitude suppression voltage in the early stage of the vibration, the amplitude can be suppressed without exerting influence on the vibration followed by the early stage.

As described above, according to the present embodiment, the vibration energy can be reduced by applying a voltage larger than the steady voltage between the mass unit and the electrode unit after the mass unit is released from the catch and release mechanism in the vibration device having the coupled vibration mechanism, and the vibration amplitude of the mass unit can be made small. For that reason, it is possible to prevent that the mass part comes into contact with the catch and release mechanism in the middle of the vibrating after the release, and the vibration device having an excellent performance can be obtained. Therefore, the detection operation can be performed with accuracy by applying such a vibration device to a gyro sensor.

In addition, the vibration device can be formed with a high accuracy by forming the above-described vibration on the semiconductor substrate by the MEMS technique. In particular, a relative positional accuracy between the electrode portion and the stopper portion of the catch and release mechanism can be increased by using a processing technique of the semiconductor device. Therefore, it is possible to increase controllability of the electrostatic attraction force working between the mass unit and the catch and release mechanism, and the vibration control described above can be made with accuracy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A vibration device, comprising:
   a coupled vibration mechanism comprising a mass unit including a plurality of mass parts, and a first connection unit connecting the plurality of mass parts;
   a catch and release mechanism configured to catch the mass unit being vibrated and release the caught mass unit to start the mass unit vibrating, the catch and release mechanism comprising an electrode unit to which a voltage for catching the mass unit is applied; and
   a control unit configured to control catching and releasing of the mass unit by a voltage to be applied between the mass unit and the electrode unit,
   wherein the control unit is configured to control the voltage to be applied between the mass unit and the electrode unit such that a voltage for reducing vibration energy of the plurality of mass parts and being greater than a steady voltage, is to be applied between the mass unit and the electrode unit before the steady voltage is applied between the mass unit and the electrode unit, and the voltage greater than the steady voltage is to be applied in at least part of a period during which the mass unit is vibrating after the mass unit is released from the catch and release mechanism.

2. The vibration device of claim 1,
   wherein, when an elapsed time since the mass unit is released from the catch and release mechanism is set to t, a period of a main resonant mode of the mass unit is set to T, and n is a positive integer,
   the control unit configured to control the voltage to be applied between the mass unit and the electrode unit such that the voltage greater than the steady voltage is to be applied between the mass unit and the electrode unit before the steady voltage is applied between the mass unit, and the voltage greater than the steady voltage is to be applied in at least part of a period satisfying $(n-1)T<t<(n-\frac{1}{2})T$.

3. The vibration device of claim 2,
   wherein the main resonant mode is an anti-phase resonant mode.

4. The vibration device of claim 2,
   wherein the control unit is configured to control the voltage to be applied between the mass unit and the electrode unit such that the voltage greater than the steady voltage is to be applied between the mass unit and the electrode unit in at least part of a period satisfying $0<t<T/2$, and the steady voltage is to be supplied between the mass unit and the electrode unit after the voltage greater than the steady voltage is applied.

5. The vibration device of claim 2,
   wherein, when a minimum voltage between the mass unit and the electrode unit, which is necessary for the catch and release mechanism to catch the mass unit, is set to VH0, the steady voltage is set to VL, and n is a positive integer,
   the control unit is configured to control the voltage to be applied between the mass unit and the electrode unit such that a voltage V1, V1 is an arbitrary voltage smaller than VH0, is to be applied between the mass unit and the electrode unit in an entire period satisfying $0<t<\tau$ and $nT-\tau<t<nT+\tau$, n is a positive integer, and $\tau$ is a period shorter than T/2, and a voltage V2, V2 is an arbitrary voltage greater than VL, is to be applied between the mass unit and the electrode unit in at least part of a period satisfying $(n-1)T+\tau<t<(n-\frac{1}{2})T$, in a period before the steady voltage is applied between the mass unit and the electrode unit.

6. The vibration device of claim 1,
   wherein the coupled vibration mechanism further includes a fixed unit including a plurality of fixed parts, and a second connection unit connecting the plurality of mass parts and the plurality of fixed parts.

7. The vibration device of claim 6,
   wherein the second connection unit includes a plurality of connection spring parts which are provided in correspondence with the plurality of mass parts.

8. The vibration device of claim 1,
   wherein the catch and release mechanism further includes a stopper unit configured to prevent the mass unit from being in contact with the electrode unit at a time of catching the mass unit.

9. The vibration device of claim 1,
   wherein the mass unit includes a first mass part and a second mass part which are arranged in a first direction.

10. The vibration device of claim 9,
wherein the first connection unit includes a connection portion connecting the first mass part and the second mass part.
11. The vibration device of claim 9,
wherein the first mass part and the second mass part vibrate in an anti-phase.
12. The vibration device of claim 1,
wherein the mass unit includes a first mass part and a second mass part which are arranged in a first direction, and a third mass part and a fourth mass part which are arranged in a second direction perpendicular to the first direction.
13. The vibration device of claim 12,
wherein the first mass part and the second mass part vibrate in an anti-phase, and the third mass part and the fourth mass part vibrate in an anti-phase.
14. The vibration device of claim 13,
wherein the third mass part and the fourth mass part move away from each other when the first mass part and the second mass part approach each other, and
wherein the third mass part and the fourth mass part approach each other when the first mass part and the second mass part move away from each other.
15. The vibration device of claim 13,
wherein the third mass part and the fourth mass part approach each other when the first mass part and the second mass part approach each other, and
wherein the third mass part and the fourth mass part move away from each other when the first mass part and the second mass part move away from each other.
16. The vibration device of claim 12,
wherein the first connection unit includes a connection portion connecting the first mass part and the third mass part, a connection portion connecting the first mass part and the fourth mass part, a connection portion connecting the second mass part and the third mass part, and a connection portion connecting the second mass part and the fourth mass part.
17. The vibration device of claim 1, further comprising:
a vibration information detection unit configured to detect vibration information of the mass unit.
18. The vibration device of claim 17,
wherein the vibration information detection unit is configured to detect a predetermined physical quantity which varies according to a vibration of the mass unit.
19. The vibration device of claim 18,
wherein the predetermined physical quantity is a physical quantity based on electrostatic capacitance, a physical quantity based on resistance, or a physical quantity based on a piezoelectric effect.
20. The vibration device of claim 17,
wherein the vibration information detection unit is configured to detect the vibration information of the mass unit based on a Coriolis force which works on the mass unit.

* * * * *